(12) United States Patent
Imam et al.

(10) Patent No.: US 9,307,586 B2
(45) Date of Patent: Apr. 5, 2016

(54) FLYBACK AC-TO-DC CONVERTER

(71) Applicants: Afroz Imam, Danvers, MA (US); Biju Antony, Lynnfield, MA (US)

(72) Inventors: Afroz Imam, Danvers, MA (US); Biju Antony, Lynnfield, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 195 days.

(21) Appl. No.: 13/951,559

(22) Filed: Jul. 26, 2013

(65) Prior Publication Data

US 2014/0028211 A1  Jan. 30, 2014

Related U.S. Application Data

(60) Provisional application No. 61/675,881, filed on Jul. 26, 2012.

(51) Int. Cl.
| | |
|---|---|
| *H05B 37/00* | (2006.01) |
| *H05B 39/00* | (2006.01) |
| *H05B 41/14* | (2006.01) |
| *H05B 33/08* | (2006.01) |
| *H02M 3/335* | (2006.01) |
| *H02M 1/42* | (2007.01) |

(52) U.S. Cl.
CPC ........... *H05B 33/08* (2013.01); *H02M 3/33507* (2013.01); *H02M 3/33515* (2013.01); *H02M 1/4208* (2013.01); *Y02B 70/126* (2013.01)

(58) Field of Classification Search
CPC ...... H02M 3/33507; H02M 3/33523; H02M 3/335; H02M 1/32; H02M 2001/0032
USPC ........... 315/200 R; 363/21.12–21.18
See application file for complete search history.

(56) References Cited

U.S. PATENT DOCUMENTS

| | | | |
|---|---|---|---|
| 6,950,319 B2 | 9/2005 | Huber et al. | |
| 7,719,862 B2* | 5/2010 | Wrathall | 363/45 |
| 2006/0245219 A1 | 11/2006 | Li | |
| 2007/0036212 A1 | 2/2007 | Leung et al. | |
| 2010/0320927 A1 | 12/2010 | Gray et al. | |
| 2011/0101898 A1* | 5/2011 | Shinomoto et al. | 318/400.3 |
| 2012/0044725 A1* | 2/2012 | Wrathall | 363/45 |

OTHER PUBLICATIONS

Claudio Adragna, AN1059 Application Note Design Equations of High-Power-Factor Flyback Converters Based on the L6561, Mar. 2000, pp. 1-20, STMicroelectronics, Italy.

(Continued)

*Primary Examiner* — Quan Tra
(74) *Attorney, Agent, or Firm* — Shaun P. Montana

(57) ABSTRACT

Techniques and corresponding circuitry and drivers are disclosed for improving power factor (PF) and total harmonic distortion (THD) of a flyback power factor correction (PFC) topology operating in transition-mode. In one or more embodiments, the PF and THD are improved by correcting the on-time of the switching element of the flyback PFC topology to actively shape the wave of the PFC input current. In some embodiments, the on-time is corrected using a phase-lock-loop module that synchronizes with the rectified input line voltage signal and a output regulator module that corrects the switch on-time. The control may be implemented using a digital or an analog controller.

18 Claims, 10 Drawing Sheets

(56) References Cited

OTHER PUBLICATIONS

Philippe Riehl, International Search Report and Written Opinion of the International Searching Authority for PCT/US2013/052320, Nov. 13, 2013, pp. 1-13, European Patent Office, Rijswijk, The Netherlands.

8-bit Atmel Microcontroller with 8/16K Bytes In-System Programmable Flash AT90PWM81 AT90PWM161, Feb. 2012, pp. 1-327, version 7734Q, Atmel Corporation, San Jose, California, USA.

* cited by examiner

FLYBACK AC-TO-DC CONVERTER

CROSS-REFERENCE TO RELATED APPLICATION

The present application claims priority of U.S. Provisional Patent Application No. 61/675,881, entitled "DIGITALLY CONTROLLED SINGLE-STAGE FLYBACK DRIVER FOR SOLID STATE LIGHT SOURCE(S)" and filed Jul. 26, 2012, the entire contents of which are hereby incorporated by reference.

TECHNICAL FIELD

The present invention relates to lighting, and more specifically, to driving lighting loads.

BACKGROUND

Electronic technology is rapidly developing to assist in environmental conservation. For example, solid state light source technology, including light emitting diodes (LED), organic light emitting diodes (OLEDs), and the like, are quickly overtaking older lighting technology (e.g., incandescent lighting, fluorescent lighting, etc.) as a preferred source for electronic illumination. Solid state light sources provide, among other things, lower power consumption, minimal heat output, more robust designs, longer life, and lower environmental impact upon disposal. Typical solid state light source-based lighting systems are powered by a driver circuit that converts alternating current (AC) power (e.g., from a conventional wall socket) or direct current (DC) power (e.g., from a battery) into a voltage level usable by the solid state light sources. The driver circuit requires components and configuration that will supplement, or at least not detract from, the efficiency of the solid state light sources.

SUMMARY

There are a number of non-trivial issues associated with powering solid state light sources within a lighting system. Solid state light sources have long lives and low maintenance requirements, and there have been continuous improvements in their luminance efficiency, making solid state light sources an attractive alternative to conventional light sources. However, various standards and regulations imposed in the lighting industry set limitations that must be considered when designing solid-state lighting systems. Many of these limitations relate to the power factor (PF) and total harmonic distortion (THD) of the drivers.

Embodiments of the present invention provide techniques and devices that improve the PF and THD of conventional PFC topologies. In some embodiments, the PF and THD of conventional flyback based PFC topologies are improved through techniques and/or devices that correct the shape of the rectified input current and/or voltage wave. In some embodiments, this is achieved by varying the on-time of a switch within the flyback circuitry, which is typically implemented with a transistor such as but not limited to a metal-oxide-semiconductor field-effect transistor (MOSFET) or bipolar-junction-transistor (BJT) or insulated-gate-BJT (IGBT), or the like. The on-time of the switch is digitally corrected using a microcontroller, in some embodiments. In such embodiments, the microcontroller utilizes a phase lock loop (PLL) and an output regulator to vary the on-time of the switch to correct the wave shape and thereby improve the PF and THD of the system. In some embodiments, the existing microcontroller of a given flyback based PFC topology may be further programmed or otherwise configured with the PLL and output regulator modules to carry out the dynamic on-time correction as described herein. Numerous other embodiments and variations are possible. For instance, the on-time switching control in some embodiments is implemented with analog componentry that provides functionality that is comparable to the digital PLL and output driver modules.

In an embodiment, there is provided a device. The device includes: a phase-lock-loop (PLL) module configured to synchronize with a rectified line voltage signal input to a flyback converter to power a load, and to detect changes in phase of the rectified line voltage signal; and an output regulator module configured to regulate at least one of output current, output voltage, and/or output power to the load, using an on-time control signal that reflects a correction factor based on phase variation in the rectified line voltage signal detected by the PLL module, wherein the on-time control signal controls switching of the flyback converter.

In a related embodiment, the PLL module may be configured to synchronize by measuring at a sampling period $T_{sampling}$ a value of the rectified line voltage signal, and adjusting the sampling period $T_{sampling}$ based on changes in frequency of the rectified line voltage signal.

In another related embodiment, the rectified line voltage signal may be divided into segments by the PLL module, and each segment may be associated with a unique on-time correction factor. In a further related embodiment, the PLL module may include a counter, and each segment may be tracked by the counter. In a further related embodiment, the output regulator module may receive a value of the counter from the PLL module, the counter value being an index value to a lookup table that comprises pre-established on-time correction factors. In another further related embodiment, the PLL module may be further configured to measure the rectified line voltage signal and to compare a current measured value of the rectified line voltage signal with a previous measured value of the rectified line voltage signal to identify a rising edge of the rectified line voltage signal. In still another further related embodiment, the PLL module may be configured to synchronize by further measuring a current value of the rectified line voltage signal and comparing the measured current value with a value of a reference point on the rectified line voltage signal. In a further related embodiment, the reference point on the rectified line voltage signal may be a maximum peak voltage of the rectified line voltage signal divided by two. In another further related embodiment, if the measured current value of the rectified line voltage signal is greater than the value of the reference point and the value of the counter is at its maximum, then the PLL module may be configured to reset the counter and to maintain a current sampling period $T_{sampling}$. In still another further related embodiment, if the measured current value of the rectified line voltage signal is greater than the value of the reference point and the value of the counter is not at its maximum, then the PLL module may be configured to reset the counter and to adjust a current sampling period $T_{sampling}$. In a further related embodiment, the current sampling period $T_{sampling}$ may be adjusted after a current phase locked loop is completed and before a next sample of the input rectified line voltage signal is measured.

In still another related embodiment, the PLL module and the output regulator module may be configured to provide digital on-time switching control of the flyback converter.

In another embodiment, there is provided a system. The system includes: a flyback converter circuit to receive a line voltage sine wave and to power a light source, the flyback converter circuit comprising a switching transistor associated with an on-time; and a microcontroller comprising a digital phase-lock-loop (PLL) module configured to synchronize with the line voltage sine wave and to detect changes in phase of the line voltage sine wave and a digital output regulator module configured to regulate at least one of output current, output voltage, and/or output power to the light source using an on-time control signal that reflects a correction factor based on phase variation in the line voltage sine wave detected by the PLL module, wherein the on-time control signal controls the switching transistor.

In a related embodiment, the PLL module may be configured to synchronize by measuring at a sampling period $T_{sampling}$ a value of the line voltage sine wave, and adjusting the sampling period $T_{sampling}$ based on changes in frequency of the line voltage sine wave. In another related embodiment, the PLL module may include a counter, wherein the line voltage sine wave may be divided into multiple segments tracked by the counter, wherein each segment may be associated with a unique on-time correction factor, and wherein the digital output regulator module may use a value of the counter as an index value to a lookup table that comprises pre-established on-time correction factors. In a further related embodiment, the PLL module may be further configured to measure a value of the line voltage sine wave and to compare the measured value with a previous measured value of the line voltage sine wave to identify a rising edge of the line voltage sine wave, and wherein the PLL module may be configured to synchronize by further measuring a value of the line voltage sine wave and comparing the measured value with a value of a reference point on the line voltage sine wave. In a further related embodiment, the reference point on the line voltage sine wave may be a maximum peak voltage of the line voltage sine wave divided by two. In another further related embodiment, if the measured value of the line voltage sine wave is greater than the value of the reference point, and the value of the counter is at its maximum, then the PLL module may be configured to reset the counter and to maintain a current sampling period $T_{sampling}$. In still another further related embodiment, if the measured value of the line voltage sine wave is greater than the value of the reference point, and the value of the counter is not at its maximum, then the PLL module may be configured to reset the counter and to adjust a current sampling period $T_{sampling}$, and wherein the current sampling period $T_{sampling}$ may be adjusted after a current phase locked loop is completed and before a next sample of the line voltage sine wave is measured.

In another embodiment, there is provided a computer readable medium. The computer readable medium is encoded with instructions that, when executed by one or more processors, cause the processor to perform operations of: synchronizing a digital phase-lock-loop (PLL) module with a rectified line voltage signal input to a flyback converter to power a load; detecting, with the PLL module, changes in phase of the line voltage signal; and regulating, with a digital output regulator module, at least one of output current, output voltage, and/or output power to the load using an on-time control signal that reflects a correction factor based on phase variation in the line voltage signal detected by the PLL module, wherein the on-time control signal controls switching of the flyback converter.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
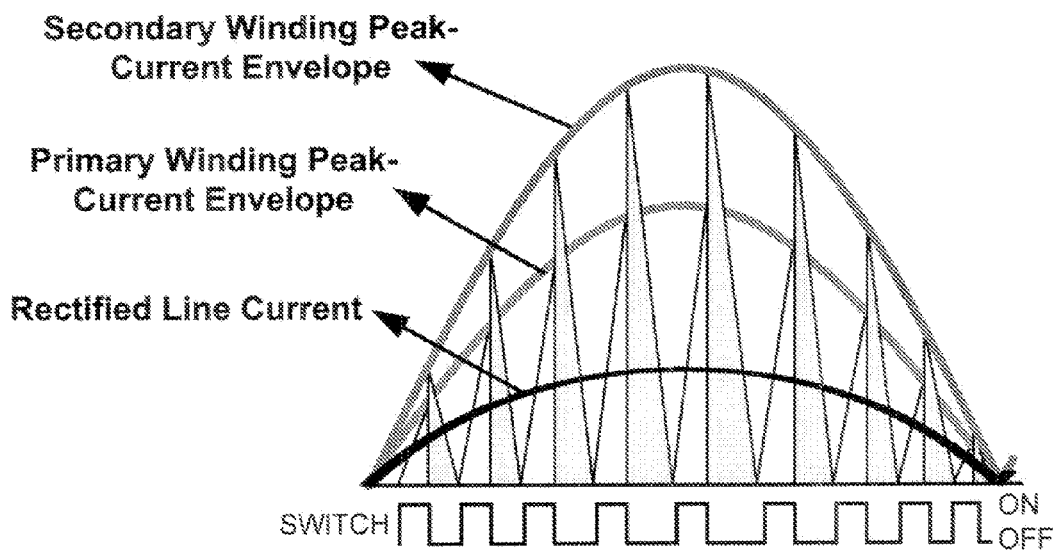
FIG. 1 shows primary and secondary windings current envelope with rectified input line current on-time current.

As used throughout, the term solid state light source(s) refers to one or more light emitting diodes (LEDs), organic light emitting diodes (OLEDs), polymer light emitting diodes (PLEDs), and any other solid state light emitter, and/or combinations thereof, whether connected in series or parallel or combinations thereof.

Techniques and corresponding circuitry and drivers are disclosed for improving power factor (PF) and total harmonic distortion (THD) of a flyback power factor correction (PFC) topology operating in transition-mode. In some embodiments, the PF and THD are improved by correcting the on-time of the switching element of the flyback PFC topology to actively shape the wave of the PFC input line current. In some specific example embodiments, the on-time is corrected using a phase-lock-loop (PLL) module that synchronizes with the rectified input line voltage signal and detects phase variation of that signal, and a output regulator module that corrects the switch on-time based on the detected phase variation. The converter may be used to power any number of loads, such as but not limited to solid state light source(s), computers, charging devices, etc. Although some embodiments provided herein are in the context of flyback PFC topologies operating in transition-mode (also known as critical conduction-mode or borderline conduction-mode or boundary conduction-mode) and respective drivers for systems including solid state light sources, the techniques may be, and in some embodiments are, readily applied or otherwise used for other applications, such as for improving PF and THD of other PFC topologies, including topologies operating in other conduction modes (e.g., continuous conduction mode (CCM) and discontinuous conduction mode (DCM)) and respective lighting drivers and/or ballasts. Numerous configurations and variations will be apparent in light of this disclosure.

To provide context for the techniques and devices used in embodiments, a mathematical analysis of flyback PFC topologies operating in transition-mode is provided. Multiple assumptions are made with respect to this analysis to explain and derive the mathematical relationships. The first assumption is that the input power source is purely sinusoidal and that it is connected to an ideal bridge rectifier and thus the rectified sinusoidal voltage may be written as shown in equation (1) below:

$$v_{in}(t) = V_{PK}|\sin(2\pi f_L t)| = V_{PK}\sin\theta = v_{in}(\theta) \quad (1)$$

where $\theta = 2\pi f_L t$, $V_{PK}$=peak of input line voltage (or the RMS line voltage, $V_{RMS}$, times the square root of 2=$V_{RMS}\sqrt{2}$), and $f_L$=input line voltage frequency (typically at 50 Hz or 60 Hz). The second assumption is that the flyback transformer is loss-less and there is a perfect magnetic coupling between the primary and secondary windings. As a result of these assumptions, the envelope of the primary side peak current is sinusoidal, and it may be written as in equation (2) below. The secondary side peak current envelope is also sinusoidal and it may be written having a turns-ratio of n as in equation (3) below. The instantaneous on-time duration for the flyback transistor (e.g., a metal-oxide-semiconductor field-effect transistor or MOSFET) may be written using equations (1) and (2) as shown in equation (4) below, where $L_P$ is the inductance of the primary winding of the flyback transformer.

$$i_{pk_p}(\theta) = I_{PK_p}|\sin\theta| \quad (2)$$

$$i_{pk_s}(\theta) = n i_{pk_p}(\theta) \quad (3)$$

$$t_{ON}(\theta) = \frac{L_p i_{pk_p}(\theta)}{v_{in}(\theta)} = \frac{L_p I_{PK_p}}{V_{PK}} \quad (4)$$

Equation (4) suggests that the on-time is a constant over the half-cycle of the input sine-wave. The off-time may be expressed as in equation (5), where $$L_s = \frac{L_p}{n^2}$$

is the inductance of the secondary winding. It shows that the off-time is variable and it is proportional to sin θ for a given input-voltage and load. $V_o$ the output voltage and $V_f$ is the forward voltage drop of the diode connected on the secondary side winding of the flyback converter. The time-period for the transition-mode of the flyback converter operation is given by equation (6) where $V_R = n(V_o + V_f)$ is the reflected voltage from the secondary winding side to the primary winding side.

$$t_{OFF}(\theta) = \frac{L_s i_{pk_s}(\theta)}{(V_o + V_f)} = \frac{\frac{L_p}{n^2} n i_{pk_p}(\theta)}{(V_o + V_f)} = \frac{L_p I_{PK_p}|\sin\theta|}{n(V_o + V_f)} \quad (5)$$

$$\begin{aligned} T &= t_{ON}(\theta) + t_{OFF}(\theta) \\ &= \frac{L_p I_{PK_p}}{V_{PK}} + \frac{L_p I_{PK_p}|\sin\theta|}{n(V_o + V_f)} \\ &= \frac{L_p I_{PK_p}}{V_{PK}}\left(1 + \frac{V_{PK}}{V_R}|\sin\theta|\right) \end{aligned} \quad (6)$$

The duty-cycle, which is the ratio between the on-time and the switching period, is calculated as shown in equation (7). The ratio of the peak input line-voltage $V_{PK}$ and the reflected voltage $V_R$ may be defined as a parameter $K_V$ as shown in equation (8). The rectified input line current is given by equation (9).

$$D = \frac{t_{ON}}{T} = \frac{1}{1 + \frac{V_{PK}}{V_R}|\sin\theta|} \quad (7)$$

$$K_V = \frac{V_{PK}}{V_R} \quad (8)$$

$$\begin{aligned} i_{in}(\theta) &= \frac{1}{2} i_{pk_p}(\theta) D \\ &= \frac{1}{2} I_{PK_p} \frac{|\sin\theta|}{1 + \frac{V_{PK}}{V_R}|\sin\theta|} \\ &= \frac{1}{2} I_{PK_p} \frac{|\sin\theta|}{1 + K_V|\sin\theta|} \end{aligned} \quad (9)$$

Figure 5A:
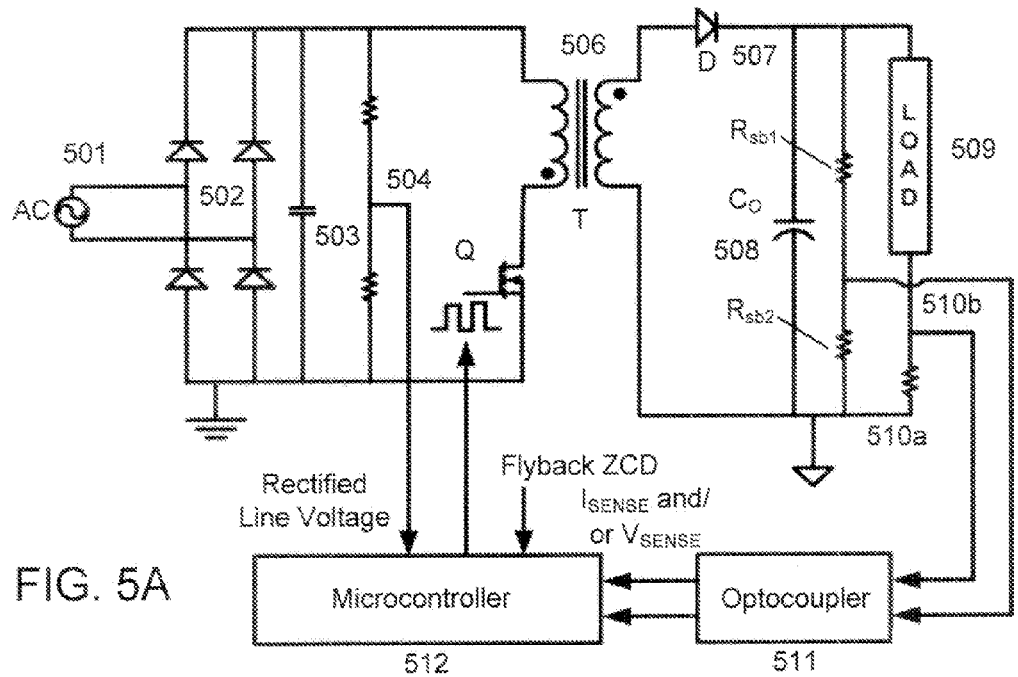
FIG. 5A shows an example single-stage flyback PFC driver circuit according to embodiments disclosed herein.

The instantaneous current on the primary winding side is of a rising triangular wave-shape during on-time, and the current flows through the switching component of the PFC circuitry (shown as the MOSFET Q in the circuitry schematic in FIG. 5A). FIG. 1 shows primary and secondary windings current envelope with rectified input line current on-time current. The current during the off-time period of the MOSFET Q (and thus in the primary winding) is zero. However, the current flows through the secondary winding during off-time in order to maintain the continuity of the magnetic flux in the core. Current in the secondary-winding during off-time is scaled by the transformer turn-ratio of the primary current and it is falling as shown in the gray shaded area triangles in FIG. 1. The instantaneous rectified line-current over input line-frequency $f_L$ is the average value of each triangle, given by equation (2), over a switching cycle period of the flyback MOSFET Q.

Figure 2:
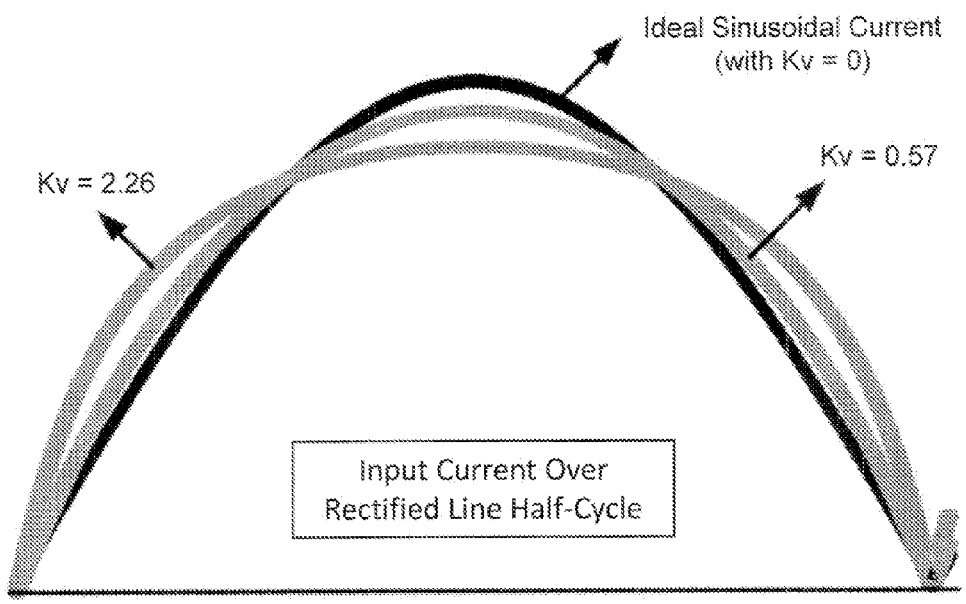
FIG. 2 shows the rectified line current over input line half-cycle for different values of $K_V$ for a conventional flyback PFC topology operating in transition-mode having all other parameters held constant.

FIG. 2 shows the input current given by equation (9) over the rectified line half-cycle for different values of $K_V$ (i.e., where $K_V$=0, 0.57, and 2.26), calculated from equation (8), for a conventional flyback PFC topology operating in transition-mode having all other parameters held constant. It shows that the input current is going to be purely sinusoidal for $K_V$=0 and becomes distorted as the value of $K_V$ increases. However, the value of $K_V$ cannot practically become zero, because it would require the reflected voltage, $V_R$, to be equal to infinity. Therefore, a flyback topology based PFC does not permit a unity power factor.

The input power $P_{in}$ may be calculated by averaging the product $v_{in}(\theta) \cdot i_{in}(\theta)$ over a line half-cycle as shown in equation (10), and to simplify this analysis, the absolute value may be dropped from $|\sin \theta|$ by considering $\theta \in [0, \pi]$. The approximate algebraic equation for the trigonometric equation in (10) may be simplified using equation (11).

$$P_{in} = \overline{v_{in}(\theta) \cdot i_{in}(\theta)} \tag{10}$$

$$= \frac{1}{2} V_{PK} I_{PK_p} \left( \frac{\sin^2 \theta}{1 + K_V \sin \theta} \right)$$

$$= \frac{1}{2} V_{PK} I_{PK_p} \left( \frac{1}{\pi} \int_0^\pi \frac{\sin^2 \theta}{1 + K_V \sin \theta} d\theta \right)$$

$$F(x) = \frac{1}{\pi} \int_0^\pi \frac{\sin^2 \theta}{1 + x \sin \theta} d\theta \tag{11}$$

$$= \frac{0.5 + 1.4 \times 10^{-3} \cdot x}{1 + 0.815 \cdot x}$$

Using equation (11) in equation (10), $P_{in}$ may be re-written as shown in equation (12). Equation (12) may be re-written to give the result shown in equation (13).

$$P_{in} = \frac{1}{2} V_{PK} I_{PK_p} \frac{0.5 + 1.4 \times 10^{-3} \cdot K_V}{1 + 0.815 \cdot K_V} \tag{12}$$

$$I_{PK_p} = \frac{2 P_{in}}{V_{PK}} \frac{1 + 0.815 \cdot K_V}{0.5 + 1.4 \times 10^{-3} \cdot K_V} \tag{13}$$

As it was assumed that the input voltage is purely sinusoidal, the power factor (PF) may be expressed as shown in equation (14), where $V_{RMS}$ is the input line voltage, $I_{RMS1}$ is the fundamental component of the input line current which is in phase with the input voltage, and $I_{RMS_{in}}$ is the total RMS value of the input line current, i.e., the RMS value of the current shown in equation (9). $I_{RMS1}$ may be calculated using equation (15). $I_{RMS_{in}}$ may be calculated using equation (9) as shown in equation (16).

$$PF = \frac{\text{Real Input Power}}{\text{Apparent Input Power}} = \frac{V_{RMS} I_{RMS1}}{V_{RMS} I_{RMS_{in}}} = \frac{I_{RMS1}}{I_{RMS_{in}}} \tag{14}$$

$$I_{RMS1} = \frac{P_{in}}{V_{RMS}} = \sqrt{2} \frac{P_{in}}{V_{PK}} \tag{15}$$

$$I_{RMS_{in}} = \sqrt{\overline{i_{in}^2(\theta)}} = \frac{1}{2} I_{PK_p} \sqrt{\frac{1}{\pi} \int_0^\pi \left[ \frac{\sin \theta}{1 + K_V \sin \theta} \right]^2 d\theta} \tag{16}$$

Inserting equations (15) and (16) into equation (14) yields the theoretical calculation for the power factor as shown in equation (17). A practical-use, simplified expression for equation (17) is given in equation (18), which calculates the power factor based on the value of $K_V$.

$$PF = \frac{I_{RMS1}}{I_{RMS_{in}}} \tag{17}$$

$$= 2\sqrt{2} \frac{P_{in}}{V_{PK} I_{PK_p}} \frac{1}{\sqrt{\frac{1}{\pi} \int_0^\pi \left[ \frac{\sin \theta}{1 + K_V \sin \theta} \right]^2 d\theta}}$$

$$PF(K_V) = 1 - 8.1 \times 10^{-3} K_V + 3.4 \times 10^{-4} K_V^2 \tag{18}$$

The total harmonic distortion (THD) of the line current is defined in percentage as shown in equation (19), where $I_{RMSn}$ is the RMS amplitude of the n-th order harmonic component. Considering ideal sinusoidal input voltage, PF and THD are related as shown in equation (20).

$$THD(\%) = 100 \frac{\sqrt{\sum_{n=2}^\infty I_{RMSn}^2}}{I_{RMS1}} \tag{19}$$

$$THD(\%) = 100 \sqrt{\frac{1}{PF^2} - 1} \tag{20}$$

Figure 3:
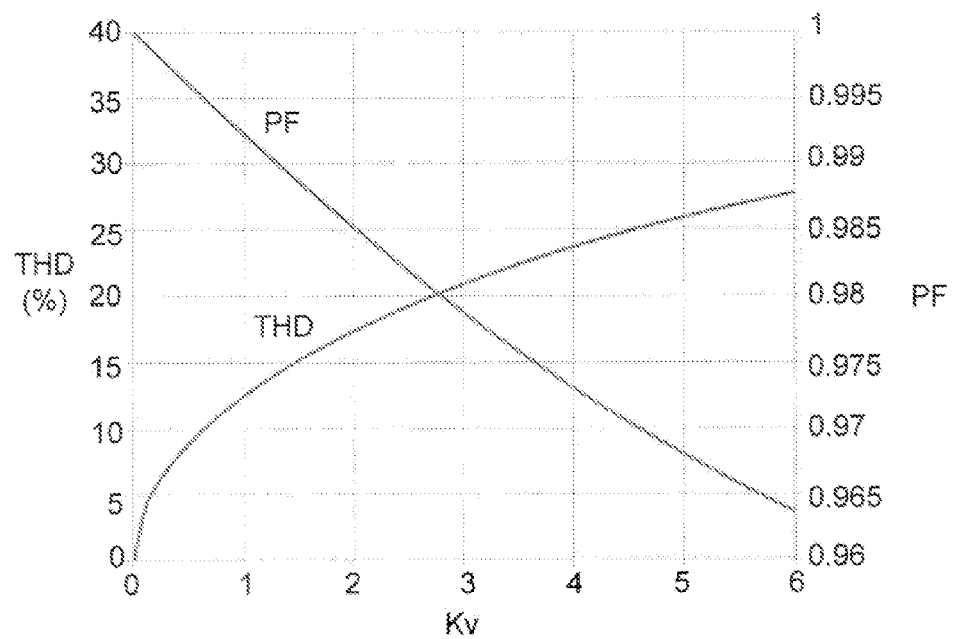
FIG. 3 shows an illustration of theoretical PF and THD curves as a function of $K_V$ for a conventional flyback PFC topology operating in transition-mode having all other parameters held constant.

Plots for theoretical PF and THD (%) with respect to $K_V$ are shown in FIG. 3. The plot for the theoretical PF line is derived from equation (18). The plot for the theoretical THD (%) line is derived from equations (20) and (18). This plot illustrates that the values of PF and THD degrade with increasing $K_V$ values, and thus increasing values of input line voltage for a given load voltage. In other words, FIG. 3 shows that the values of PF and THD degrade with decreasing load voltage for a given input voltage.

Figure 4:
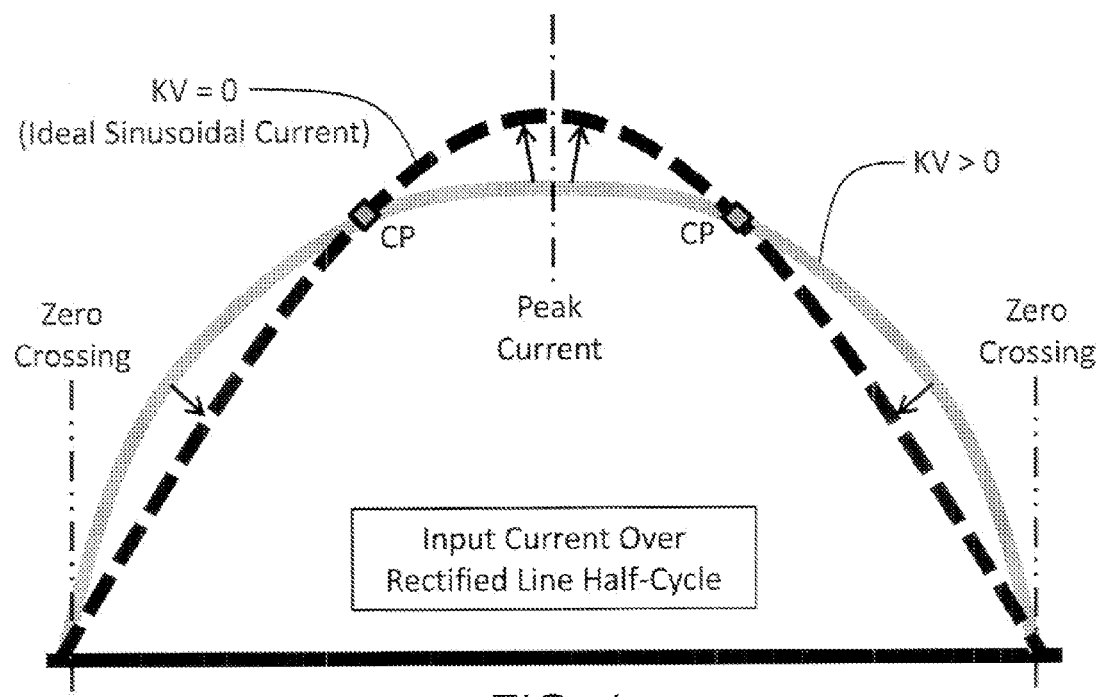
FIG. 4 shows the rectified line current over input line half-cycle for $K_V=0$ and $K_V>0$ for a conventional flyback PFC topology operating in transition-mode having all other parameters held constant.

The above mathematical analysis of flyback PFC topologies operating in transition-mode helps reveal concepts relevant to one or more embodiments of the present invention. First, equation (4) suggests that the MOSFET on-time is a constant over the half-cycle of the input sine-wave; consequently, conventional flyback PFC topologies operating in transition-mode use constant on-times. Second, because the value of $K_V$ cannot practically become zero, flyback PFC topologies cannot achieve unity power factor (where PF=1). Third, equations (8) and (9) and FIG. 2 illustrate that the ideal input current wave shape (where PF=1) is sinusoidal and that as $K_V$ increases, the rectified line current becomes distorted. Fourth, as $K_V$ increases, and the rectified input current wave shape becomes distorted, PF and THD worsen, as shown in FIG. 3. FIG. 4 shows the input current over the rectified line half-cycle for $K_V=0$ and $K_V>0$ for a conventional flyback PFC topology operating in transition-mode having all other parameters held constant. The crossing points (CPs) are shown to indicate where input current waves having $K_V>0$ cross with the ideal sinusoidal wave. This figure illustrates that the distortion caused by increasing $K_V$ values results in the rectified input line current being higher in the regions between the zero crossings and the CPs with respect to the ideal sinusoidal current. The distortion caused by increasing $K_V$ values also results in the input current being lower in the peak current region between the CPs, with respect to the ideal sinusoidal current. Although FIG. 4 illustrates the distortion for the rectified line current, these distortion concepts also apply to the rectified line voltage over an input line half-cycle.

As previously explained, the ideal sinusoidal wave shape cannot be achieved in a flyback PFC topology operating in transition-mode; however, by actively shaping the input current and/or voltage of flyback PFC topologies operating in transition-mode, conventional wave shapes may be corrected to move the input wave closer to the ideal sinusoidal wave, thereby improving PF and THD. The wave shape correction may be, and in some embodiments is, achieved by varying the on-time of the switch component (e.g., a MOSFET) within the flyback PFC topology. In some instances, the on-time may be decreased in the regions between zero crossings and CPs and/or increased in the peak current region between CPs. The corrected on-time may be proportional to the difference between the conventional input wave for a given $K_V$ value and the ideal sinusoidal input wave (where $K_V=0$) for a flyback PFC topology operating in transition-mode. For example, where the conventional input wave is higher than the ideal input wave, the on-time may be decreased, and where the conventional input wave is lower than the ideal input wave, the on-time may be increased, as indicated by the arrows in FIG. 4.

FIG. 5A shows a circuit diagram of a single-stage flyback PFC circuit. As may be seen, the circuit includes a flyback PFC topology that receives an alternating current (AC) input 501 and drives a load 509, which may be, for instance, and in some embodiments is, a light source. In more detail, the circuit includes a bridge rectifier 502, a filter capacitor 503, a voltage divider 504, a switch Q (e.g., a MOSFET), a flyback transformer T 506, a flyback diode D 507, an operating capacitor Co 508, the load 509, a sense current resistor 510a, a sense voltage divider of resistors $R_{Sb1}$ and $R_{Sb2}$ 510b, an optocoupler 511, and a flyback zero crossing detector (ZCD) microcontroller 512. In other embodiments, any number of other suitable PFC flyback configurations operating in transition-mode may be used, as will be apparent in light of this disclosure. In some embodiments, the wave-shaping techniques described herein are performed digitally using the microcontroller 512, which in some embodiments is implemented, for example, with an ATMEL AT90PWM81 microcontroller. Other suitable microcontrollers will be apparent in light of this disclosure, and the claimed invention is not intended to be limited to any particular one. In other embodiments, the wave-shaping techniques are performed using analog circuit elements (such as but not limited to resistors, capacitors, filters, phase detectors, current regulators, etc.) to perform the same functions that the microcontroller 512 performs digitally, as described herein, so as to provide analog on-time switching control.

Figure 5B:
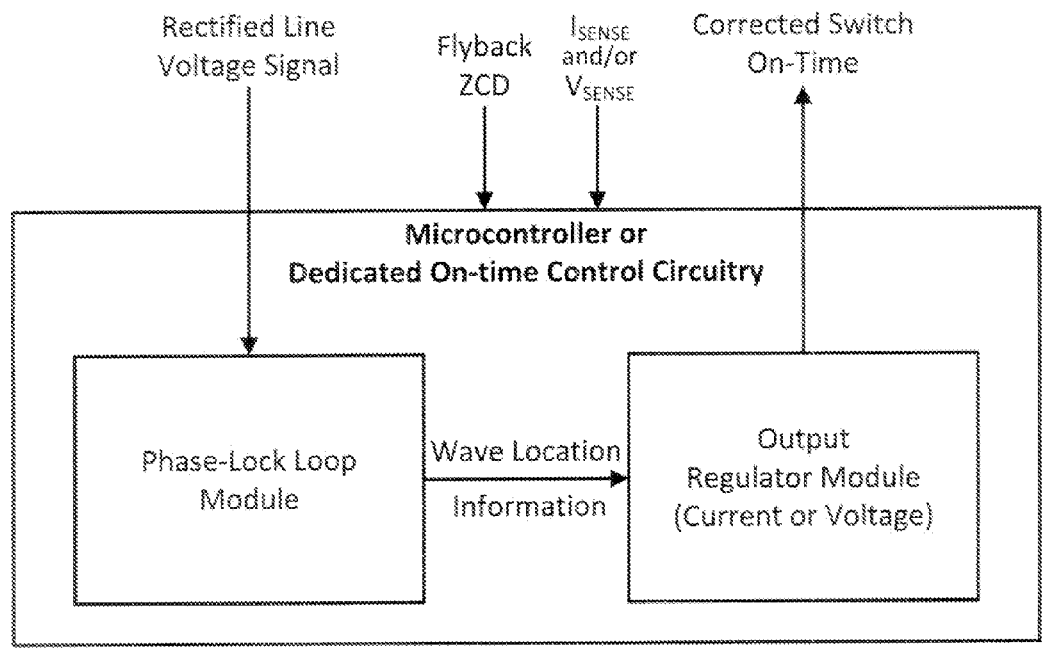
FIG. 5B shows a block diagram of a microcontroller (digital) or dedicated circuitry (analog) used to implement a wave-shaping technique in the PFC driver circuit according to embodiments disclosed herein.

FIG. 5B shows a flyback PFC control circuit configured to implement a wave-shaping technique. As may be seen, the flyback PFC control circuit may be, and in some embodiments is implemented, for example, with a digital microcontroller and embedded routines, or with dedicated analog circuitry to carry out similar functions. In addition to performing the typical functions that a flyback PFC microcontroller or analog control circuit performs, the microcontroller/analog circuitry may be programmed or otherwise configured to actively shape the wave of the PFC input. As previously explained, the active wave-shaping technique may be achieved by correcting the on-time of the switch Q shown in FIG. 5A to move the PFC input current wave closer to the ideal sinusoidal current wave. The on-time may be corrected, for example, using a digital PLL module and a digital output regulator module, in some embodiments. In some embodiments, an analog implementation will be equally apparent. In any such cases, the PLL module uses the rectified line voltage signal to determine wave location information or phase information. The wave location information is then conveyed to the output regulator module, allowing the output regulator module to vary the switch on-time to the corrected duration. For example, looking at FIG. 4, if the wave location is between zero crossing and a crossing point CP, then the on-time may be decreased to move the non-corrected wave closer to the ideal wave (as indicated by the arrows) in order to improve PF and THD.

In some embodiments, the PLL module is configured to synchronize with the rectified line voltage signal input to determine wave location/phase information. By synchronizing with the rectified line voltage signal, the PLL module may detect and account for changes and/or deviations in the expected line voltage signal due to fluctuations or changes in the line frequency. In some embodiments, the PLL implementation is partially or entirely digital, such as but not limited to a software-based PLL. A PLL implemented in analog components may be, and in some embodiments is, also used. In some embodiments, the wave location/phase information is determined using other modules whose input is the rectified line voltage signal, as long as the module outputs wave location/phase angle information. In some embodiments, the rectified line voltage sinusoidal half-wave is divided into a constant number of segments. The number of the segments chosen may depend, for instance, on the desired resolution of the on-time correction versus the limitation(s) of the peripherals of the microcontroller (or dedicated circuitry). The segments may each be associated with a unique on-time correction factor that is determined based on the parameters of the flyback PFC topology. The segments may be tracked using a counter included in the PLL module. The associated unique on-time correction factor per counter value may be pre-established and entered into a look-up table for the output regulator module to reference. Each segment may last the same duration, $T_{sampling}$, which may be adjusted using a $T_{sampling}$ regulator within the PLL to help synchronize the counter values with the rectified line voltage signal input. The adjustments allow the counter value to reset (counter=0) at predetermined synchronizing reference points on the line voltage signal. In other words, the $T_{sampling}$ regulator adjusts the duration of each segment to output the proper counter value to the output regulator module.

In some embodiments, the output regulator module is a current regulator or a voltage regulator, depending on the type of load to which it is coupled. For example, in lighting applications, the load may be one or more solid state light sources or one or more devices including solid state light sources, which would implicate an output current regulator. However, in other embodiments, the load may be, for instance, a laptop or cell phone charger, which would implicate an output voltage regulator. Hence, FIGS. 5A-B show both $V_{SENSE}$ and/or $I_{SENSE}$, so as to address all such applications. While embodiments are provided in the context of lighting systems, numerous other applications will be apparent. For instance, the techniques and systems provided herein may be used, for example, for applications where output current is regulated other than current control of one or more solid state light sources, as well as for applications where output voltage is controlled, rather than output current. Likewise, the techniques and systems provided herein may be used, for example, for applications where output power needs to be regulated.

Figure 6:
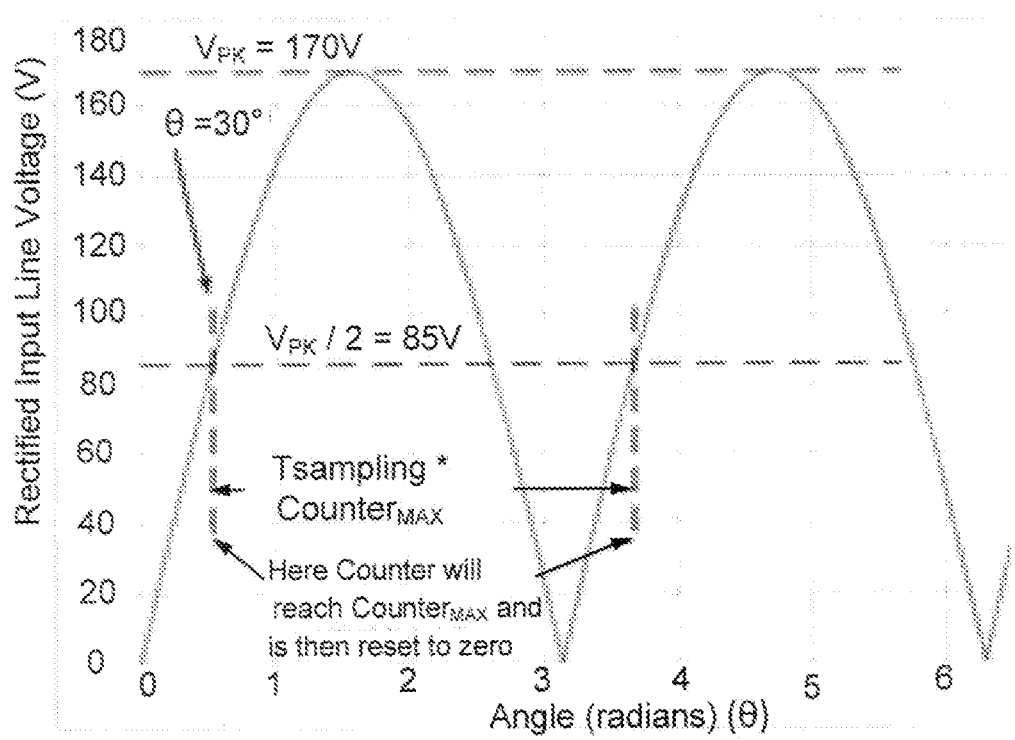
FIG. 6 shows an example rectified line voltage signal input with synchronizing reference points according to embodiments disclosed herein.

FIG. 6 shows an example rectified line voltage signal input with synchronizing reference points. The rectified line voltage signal sinusoidal half-wave is divided into $Counter_{MAX}$ segments, specifically 96 segments, and a variable counter is used to track the segment number in real-time. Therefore, the value of counter could change from 0 to ($Counter_{MAX}-1$), i.e., in this example, from 0 to 95. The value of $Counter_{MAX}$ is a constant for a given application. As described herein, the PLL module uses a reference point on rectified line voltage signal sinusoidal half-wave which allows the PLL module to synchronize with the rectified line voltage signal wave and provide the proper wave location information using the counter variable. Thus, the PLL module provides the segment information in real-time using the counter variable to the output regulator module to correct the switch on-time and actively shape the output current wave. In this example, the rising edge of the rectified half-wave at $|Vin*\sin(\theta)|=(V_{PK}/2)$ is chosen as the reference point for synchronization. This is the region of the sinusoidal input line-voltage that is away from zero crossing point and variation in the rectified line-voltage is relatively linear. Since $V_{PK}$ is 170V in this example, the synchronizing reference point is the 85V mark on the rising edge of the rectified half-wave. In the normal case, where there are no fluctuations in the line voltage input, the counter value should reach to (Counter$_{MAX}$−1) at the point |Vin*sin (θ)|= ($V_{PK}$/2). In this example, the counter value should equal 95 at the 85V synchronizing reference point on the rising edge. However, fluctuations occur causing the PLL module to go out of synchronization. Therefore, a T$_{sampling}$ regulator is included in the PLL module to regulate the T$_{sampling}$ value. As described herein, T$_{sampling}$ is not a constant and its value may be, and in some embodiments is, adjusted by the T$_{sampling}$ regulator to ensure that there are exactly Counter$_{MAX}$ segments from one synchronizing reference point to the next. The T$_{sampling}$ regulator may, and in some embodiments does, adjust or otherwise regulate the T$_{sampling}$ value in such a way that it meets the criteria given below in equation (21):

$$T_{sampling} * Counter_{MAX} = 1/(2 f_{line}) \quad (21)$$

where $f_{line}$ is the frequency of the sinusoidal input line voltage. In some embodiments, for instance, the value of $f_{line}$ is 50 Hz or 60 Hz with a given tolerance (e.g., +/−0.5 Hz). However, smaller power generation stations may have a bigger tolerance level. As will be appreciated in light of this disclosure, the techniques provided herein may accommodate much wider variations in the value of $f_{line}$, if so desired. Consequently, the T$_{sampling}$ regulator may adjust the T$_{sampling}$ value to synchronize the PLL module to input lines having different frequencies and tolerances, while accounting for fluctuations or changes in the line frequency caused by, for example, overloading, inadequate infrastructure, or lightning.

Figure 7A:
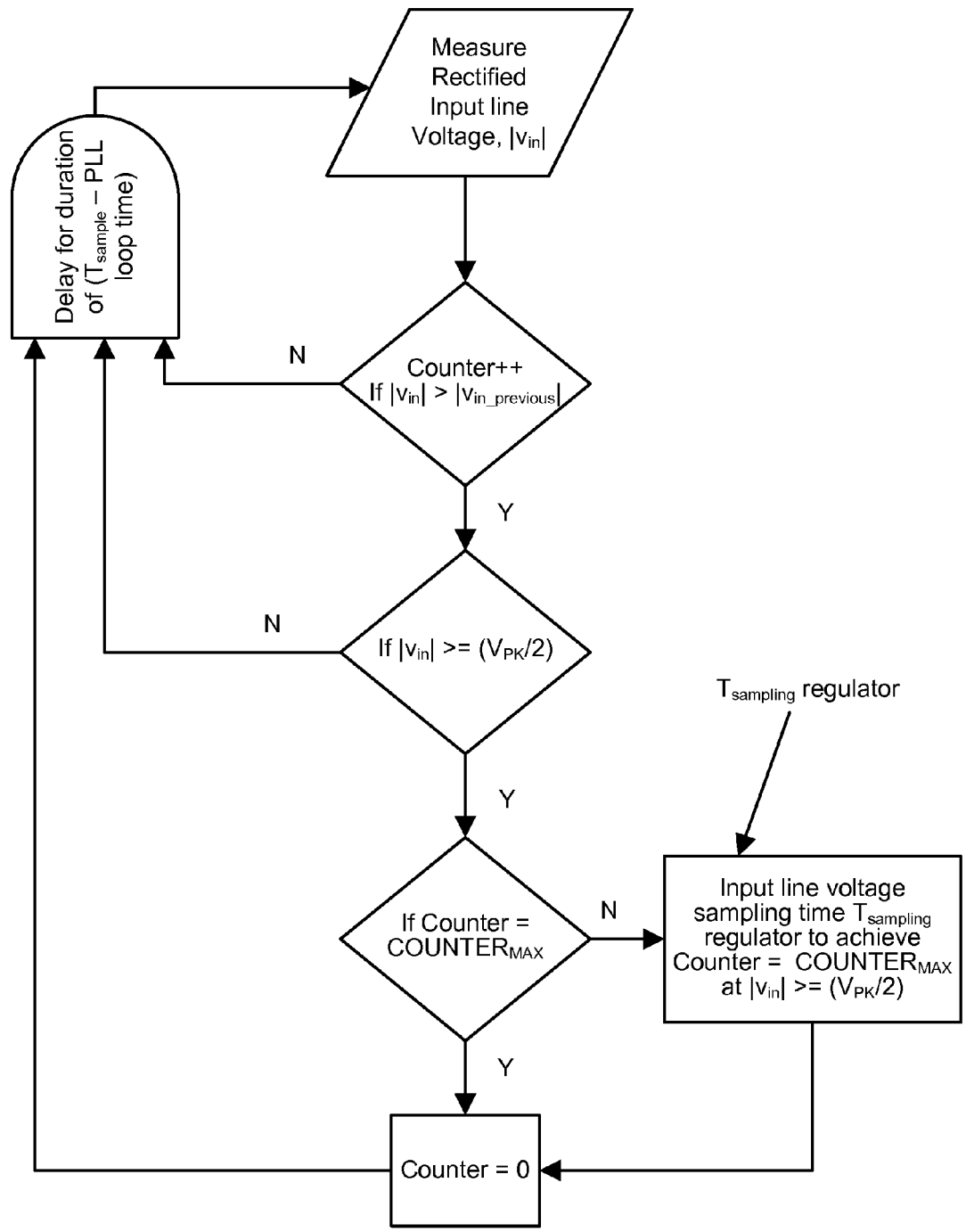
FIG. 7A shows a PLL module synchronization technique according to embodiments disclosed herein.

FIG. 7A shows a flowchart used for the synchronization or locking with the rectified input voltage sine-wave for the PLL. As may be seen, the rectified sinusoidal half-wave is divided into a fixed number of segments, say Counter$_{MAX}$. As previously explained, a variable counter is used to track the segment number in real-time. Therefore, the value of the counter could change, for example, from 0 to (Counter$_{MAX}$−1). The value of Counter$_{MAX}$ is a constant for a given application. The PLL module requires having a reference point on the rectified sine-wave with-respect-to which the PLL module will have to lock or synchronize. In FIG. 7A, the rising edge of the rectified sine-wave at half of the peak input-voltage is chosen as the reference for the synchronization, i.e. |v$_{in}$(θ)|=(V$_{PK}$/2), and this is equal to the phase-angle of θ=30° as shown in FIG. 6. This is the region of the sinusoidal input line-voltage which is away from the zero crossing point and variation in the rectified line-voltage is relatively linear. Therefore, the implementation of the locking-point at θ=30° in the PLL firmware executing in the microcontroller is easier to achieve. In a normal case when the phase locked loop is locked with the input sine wave, the counter value should reach to (Counter$_{MAX}$−1) at the point θ=30°. However, there could be a change in the input line voltage frequency around 50 Hz or 60 Hz, for example, which may cause the PLL module to go out of synchronization. Therefore, and as previously explained, the chosen sampling interval T$_{sampling}$ is not a constant and its value could vary with-respect-to input voltage line frequency. Hence, and in accordance with some embodiments, a T$_{sampling}$ regulator is implemented in the firmware of the microcontroller to regulate the value. In some embodiments, the T$_{sampling}$ regulator regulates the T$_{sampling}$ value in such a way that it meets the criteria as previously given in equation (21). As stated before, the value of Counter$_{MAX}$ is a constant for a given application. The number of the segments of Counter$_{MAX}$ chosen will depend on factors such as but not limited to the resolution of the on-time correction needed versus limitations of the peripherals of the microcontroller used. The sampling interval T$_{sampling}$ of the rectified sine-wave is dependent on the input line frequency of, for instance, 50 Hz or 60 Hz. The sampling intervals for 50 Hz and 60 Hz input sinusoidal voltage are given by following relationships, as respectively indicated in equations (22) and (23). As may be seen, this sets the value of Counter$_{MAX}$ to be 96, which yields a T$_{sampling\_max}$ of 104 μs, and a T$_{samping\_min}$ of 87 μs.

$$T_{sampling\_max} = \frac{10^6}{2 \times 50 \text{ Hz} \times COUNTER_{MAX}} \mu s \quad (22)$$
$$= \frac{10^6}{2 \times 50 \text{ Hz} \times 96} \mu s \cong 104 \ \mu s$$

$$T_{sampling\_min} = \frac{10^6}{2 \times 60 \text{ Hz} \times COUNTER_{MAX}} \mu s \quad (23)$$
$$= \frac{10^6}{2 \times 60 \text{ Hz} \times 96} \mu s \cong 87 \ \mu s$$

With further reference to the flowchart in FIG. 7A, first the rectified input line-voltage is measured and compared with the previous measured value of the rectified input line-voltage. If the new value is greater than the previous measured value, then it means that it is the rising edge of the rectified input line-voltage. If the condition is true, then the measured rectified input line-voltage is compared with half of the peak input sine voltage (V$_{PK}$/2). Again, if the measured value is greater than (V$_{PK}$/2), then the counter value is reset to zero. At the same time, it is also checked whether the counter has reached the (COUNTER$_{MAX}$−1) value. If not, then it will enter into the T$_{sampling}$ regulator to adjust the value of T$_{sampling}$ to satisfy the requirement shown in equation (21) before resetting the counter value to zero. The corresponding T$_{sampling}$ regulator block is shown in FIG. 7A. At this stage, it completes a loop of the phase locked loop, and it is ready to measure a next sample of the rectified input line-voltage. In some embodiments, a flag in the PLL firmware is used to indicate that the locking-point has been crossed so as to avoid resetting of the counter value in subsequent cycles unless it crosses the locking-point θ=30° next time.

After the completion of a phase locked loop, the next sample needs to be measured a T$_{sampling}$ time after the previous measurement. Therefore, a delay for the duration of T$_{sampling}$−time taken by the phase locked loop is inserted before entering into the phase locked loop again to measure the next sample of the rectified input line-voltage. In some embodiments, each segment of the half sine-wave is associated with a unique correction-factor in MOSFET PWM on-time, which is obtained from the output regulator block, which may be a current regulator or a voltage regulator, depending on the load. The value of the counter is used as an index number in real-time for determining the correct correction factor from the look-up table.

Figure 7B:
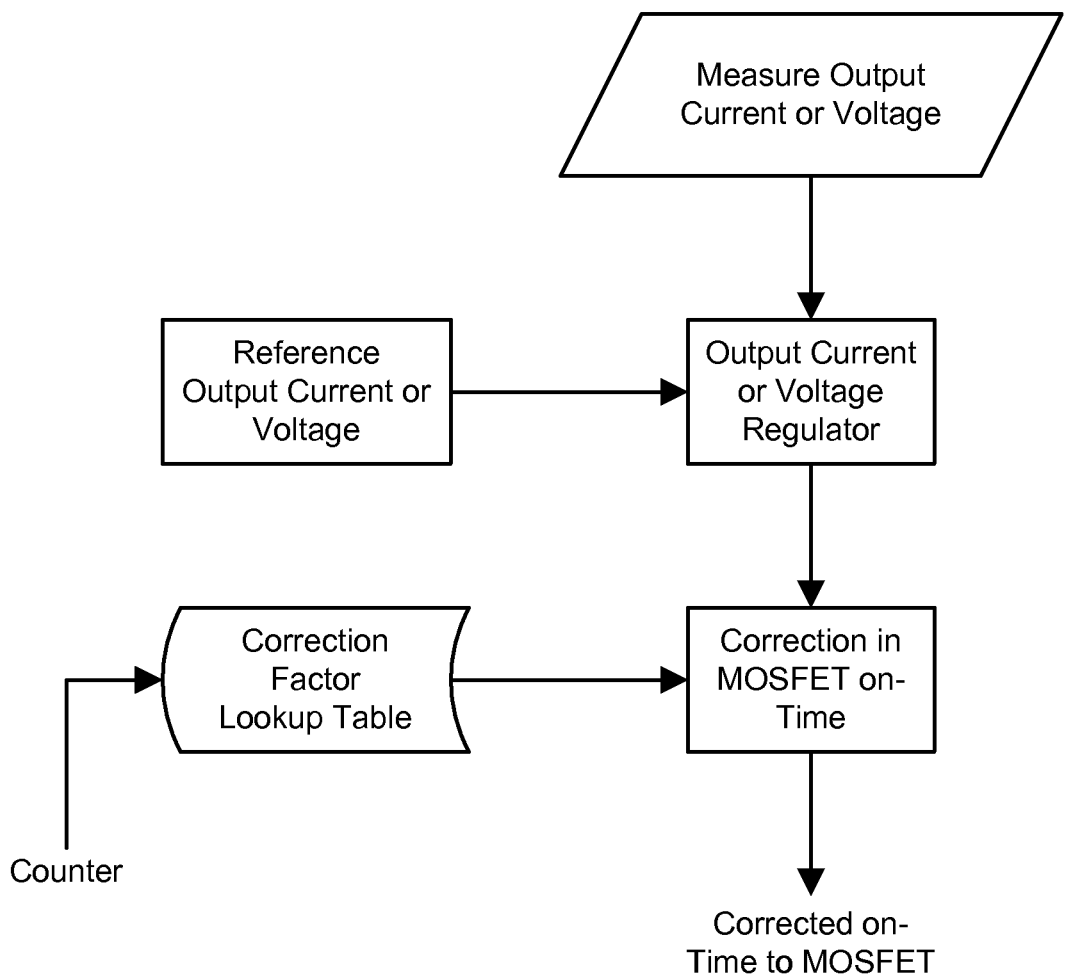
FIG. 7B shows an output regulator module correction technique according to embodiments disclosed herein.

The counter value is sent to the output regulator module to allow for on-time correction. FIG. 7B shows an output regulator module correction technique. The counter value is input into the regulator module. The counter value may be, and in some embodiments is, used as an index value in a look-up table. The index value may, in some embodiments does, correspond to a pre-established on-time correction factor, on-time correction percentage, or actual corrected on-time within the look-up table. The input counter value dictates the index value, which allows the regulator module to control the switch (e.g., a MOSFET) of the flyback converter using the corrected on-time. In embodiments where the load is one or more solid state light sources, the flow of FIG. 7B is configured for regulating the output current of the solid state light sources. In one such example case, a measured value of the solid state light sources is compared with a reference value of the solid state light source current. Error in the solid state light source current is passed through a proportional-integral (PI) controller. The bandwidth of the PI controller is kept relatively low (e.g., below 20 Hz) to ensure good power factor. As will be appreciated in light of this disclosure, output of the PI controller is the MOSFET PWM on-time. A correction factor is applied in the on-time before using it for MOSFET PWM.

Figure 8A:
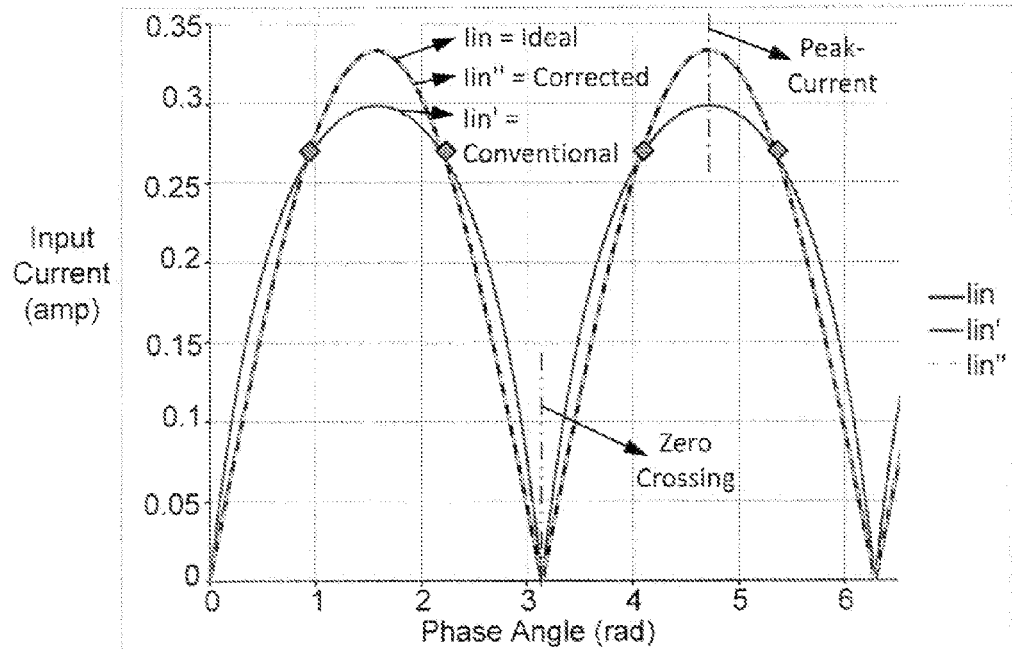
FIG. 8A shows a graphical illustration of three theoretical rectified PFC line current curves for a flyback PFC topology operating in transition-mode having the same parameters, according to embodiments disclosed herein.

FIG. 8A shows a graphical illustration of three theoretical rectified PFC line current curves for a flyback PFC topology operating in transition-mode having the same parameters, in accordance embodiments. The specific parameters used in the example shown in FIG. 8A were: RMS input voltage=120V; regulated output current=1 A; LED string voltage=25V; efficiency=89%; and $K_{\gamma}$=1.04. The three theoretical PFC input curves are: 1) $I_{in}$—the plot of the ideal rectified line current with unity power factor; 2) $I_{in}'$—the plot of the rectified line current of a conventional flyback PFC topology having constant on-time; and 3) $I_{in}''$—the plot of the corrected rectified line current after active wave-shaping as described herein.

Figure 8B:
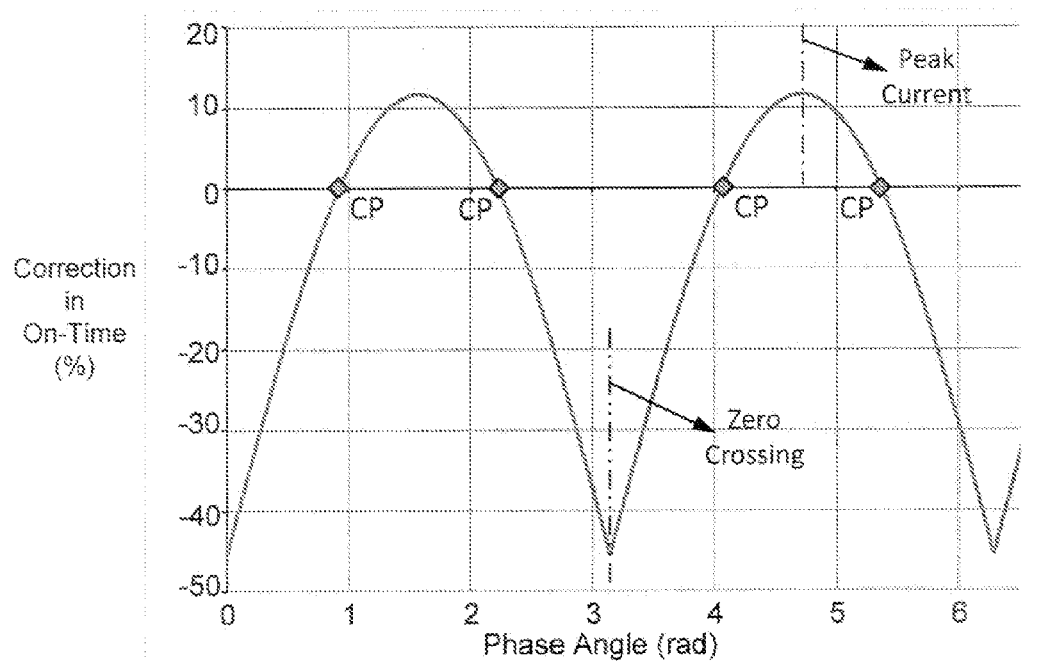
FIG. 8B shows a graphical illustration of the percentage correction in on-time with respect to phase angle, according to embodiments disclosed herein.

FIG. 8B shows a graphical illustration of the percentage correction in on-time with respect to phase angle, in accordance with FIG. 8A. The conventional plot $I_{in}'$ of FIG. 8A was corrected according to the percentage correction in on-time shown to obtain the corrected plot $I_{in}''$. As illustrated, the on-time was decreased between zero crossing and the CPs and increased between the CPs in the peak current region to correct the wave shape and move it as close to the ideal wave shape as allowed by the limitations of the microcontroller to improve PF and THD. The on-time may be adjusted in proportion to the amount of distortion between the conventional wave shape and the ideal sinusoidal wave to achieve maximum correction.

Figure 9:
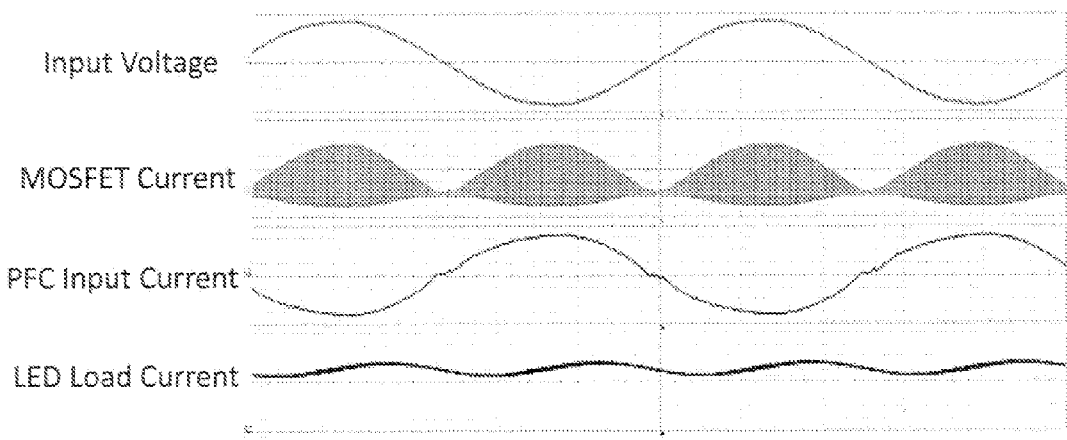
FIG. 9 shows example plots for input voltage, MOSFET Q current, PFC input line current, and LED load current with correction, according to embodiments disclosed herein.
Figure 10:
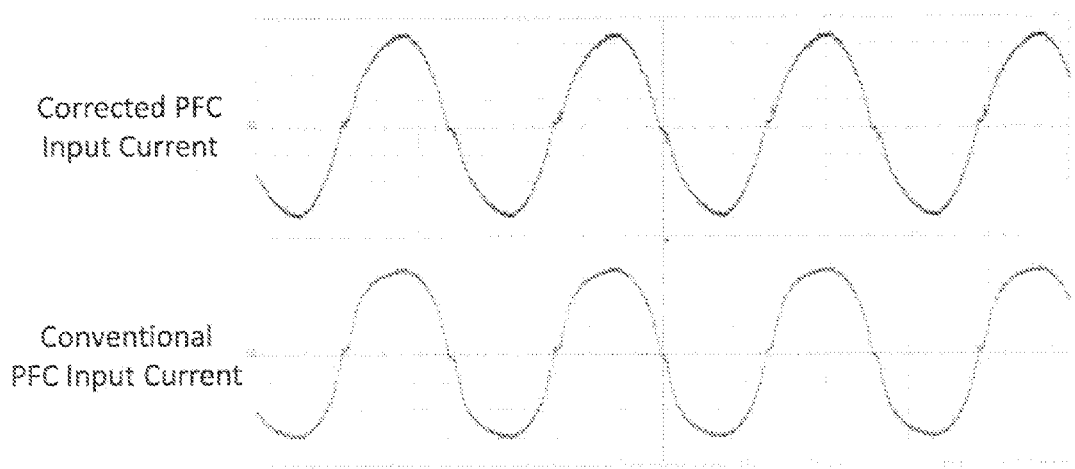
FIG. 10 shows example plots for the PFC input line current of FIG. 9 with and without on-time correction, according to embodiments disclosed herein.

An example prototype based on the circuit diagram shown in FIG. 5A was built using a MOSFET switching element Q and a microcontroller 512 having a digital PLL module and digital output regulator, as described herein. The design parameters used were the same as those used in FIG. 8A, i.e., RMS input voltage=120V; regulated output current=1 A; LED string voltage=25V; efficiency=89%; and $K_{\gamma}$=1.04. FIG. 9 shows plots for input voltage, MOSFET Q current, PFC input current, and LED load current with correction, in accordance with embodiments. FIG. 10 shows example plots for the PFC input current of FIG. 9 with and without on-time correction, in accordance with embodiments. The PFC input current wave without on-time correction is the conventional wave. As may be seen, the corrected input current wave is closer in shape to the ideal sine wave compared to the conventional input current wave. The example prototype resulted in a reduction in THD from 11% to 5% and an increase in PF from 0.983 to 0.998 as a result of the correction to the input current wave shape.

Figure 11A:
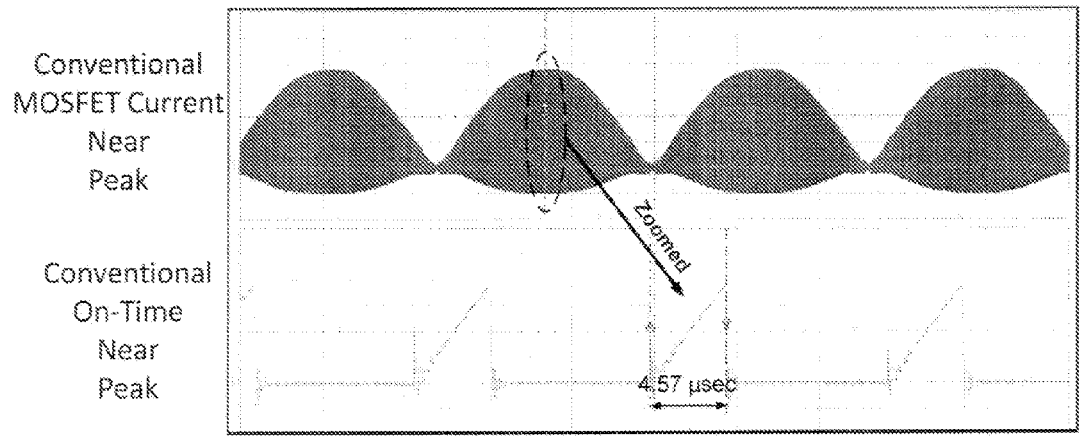
FIGS. 11A and 11B show the zoomed waveforms of the MOSFET Q current of FIG. 9 near peak and near zero-crossing, respectively, without on-time correction.
Figure 11B:
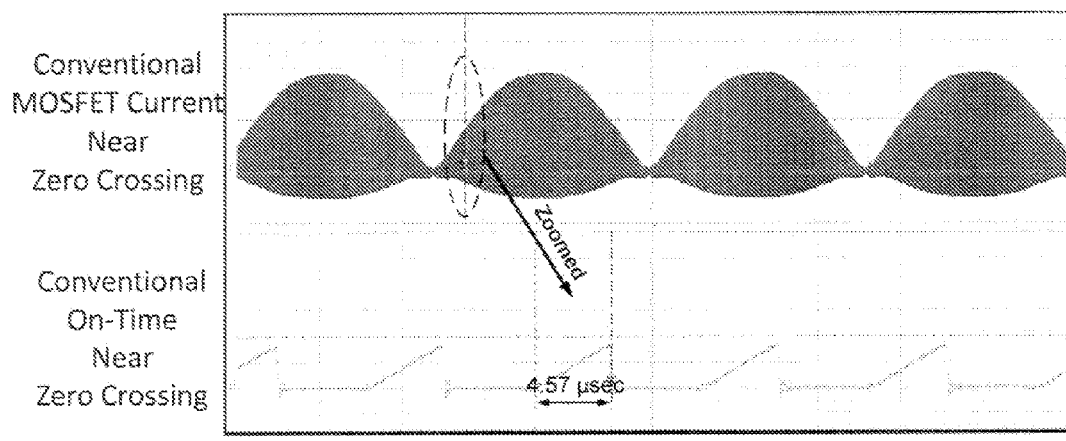

FIGS. 11A and 11B show the zoomed waveforms of the MOSFET Q current of FIG. 9 near peak and near zero-crossing, respectively, without on-time correction. As previously explained, the on-time of conventional flyback PFC topologies operating in transition-mode is constant. Accordingly, the on-time near peak and zero crossing are the same as shown, specifically 4.57 microseconds in this example embodiment.

Figure 12A:
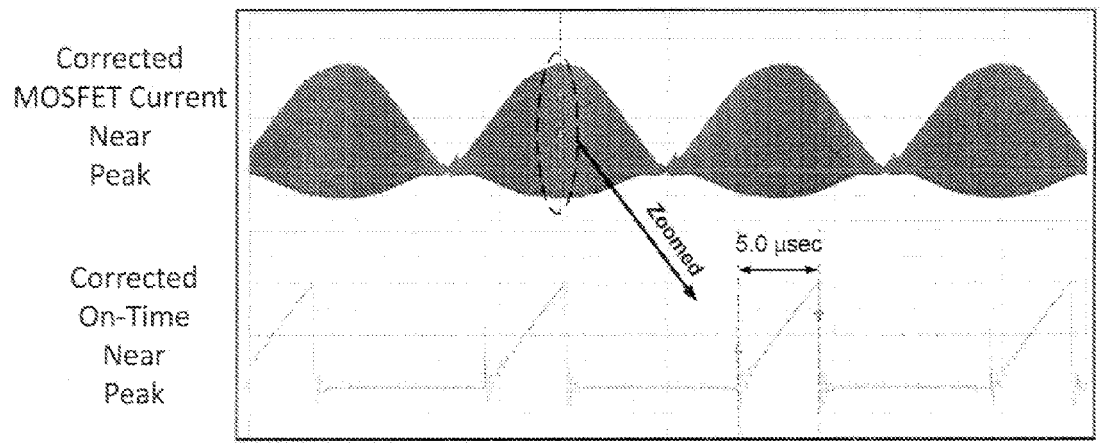
FIGS. 12A and 12B show the zoomed waveforms of the MOSFET Q current of FIG. 9 near peak and near zero-crossing, respectively, with active on-time correction, according to embodiments disclosed herein.
Figure 12B:
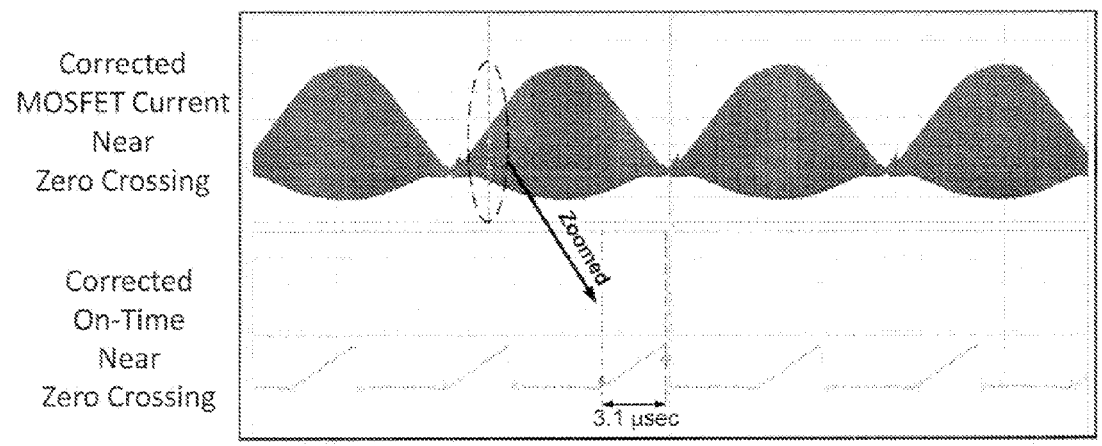

FIGS. 12A and 12B show the zoomed waveforms of the MOSFET Q current of FIG. 9 near peak and near zero-crossing, respectively, with active on-time correction, in accordance with embodiments. As described herein, the active wave shaping techniques may be implemented by increasing on-time near the peak current regions and decreasing on-time near the zero crossing regions. Accordingly, the on-time has been increased near peak and decreased near zero crossing as shown, specifically increasing from 4.57 to 5.0 microseconds near peak and decreasing from 4.57 to 3.1 microseconds near zero crossing in this example embodiment. As previously mentioned, the corrections in the on-time improved THD (from 11% to 5%, lower is better) and PF (from 0.983 to 0.998, higher is better).

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A device, comprising:
a phase-lock-loop (PLL) module configured to synchronize with a rectified line voltage signal input to a flyback converter to power a load, and to detect changes in phase of the rectified line voltage signal; and
an output regulator module configured to regulate at least one of output current, output voltage, and/or output power to the load, using an on-time control signal that reflects a correction factor based on phase variation in the rectified line voltage signal detected by the PLL module, wherein the on-time control signal controls switching of the flyback converter;
wherein the PLL module is configured to synchronize by measuring at a sampling period Tsampling a value of the rectified line voltage signal, and adjusting the sampling period Tsamplinq based on changes in frequency of the rectified line voltage signal.

2. The device of claim 1, wherein the rectified line voltage signal is divided into segments by the PLL module, and wherein each segment is associated with a unique on-time correction factor.

3. The device of claim 2, wherein the PLL module comprises a counter, and wherein each segment is tracked by the counter.

4. The device of claim 3, wherein the output regulator module receives a value of the counter from the PLL module, the counter value being an index value to a lookup table that comprises pre-established on-time correction factors.

5. The device of claim 3, wherein the PLL module is further configured to measure the rectified line voltage signal and to compare a current measured value of the rectified line voltage signal with a previous measured value of the rectified line voltage signal to identify a rising edge of the rectified line voltage signal.

6. The device of claim 3, wherein the PLL module is configured to synchronize by further measuring a current value of the rectified line voltage signal and comparing the measured current value with a value of a reference point on the rectified line voltage signal.

7. The device of claim 6, wherein the reference point on the rectified line voltage signal is a maximum peak voltage of the rectified line voltage signal divided by two.

8. The device of claim 6, wherein if the measured current value of the rectified line voltage signal is greater than the value of the reference point and the value of the counter is at its maximum, then the PLL module is configured to reset the counter and to maintain a current sampling period Tsampling.

9. The device of claim 6, wherein if the measured current value of the rectified line voltage signal is greater than the value of the reference point and the value of the counter is not at its maximum, then the PLL module is configured to reset the counter and to adjust a current sampling period Tsampling.

10. The device of claim 9, wherein a current sampling period Tsampling is adjusted after a current phase locked loop is completed and before a next sample of the input rectified line voltage signal is measured.

11. The device of claim 1, wherein the PLL module and the output regulator module are configured to provide digital on-time switching control of the flyback converter.

12. A system, comprising:
a flyback converter circuit to receive a line voltage sine wave and to power a light source, the flyback converter circuit comprising a switching transistor associated with an on-time; and
a microcontroller comprising a digital phase-lock-loop (PLL) module configured to synchronize with the line voltage sine wave and to detect changes in phase of the line voltage sine wave and a digital output regulator module configured to regulate at least one of output current, output voltage, and/or output power to the light source using an on-time control signal that reflects a correction factor based on phase variation in the line voltage sine wave detected by the PLL module, wherein the on-time control signal controls the switching transistor;

wherein the PLL module is configured to synchronize by measuring at a sampling period Tsampling a value of the line voltage sine wave, and adjusting the sampling period Tsampling based on changes in frequency of the line voltage sine wave.

13. The system of claim 12, wherein the PLL module comprises a counter, wherein the line voltage sine wave is divided into multiple segments tracked by the counter, wherein each segment is associated with a unique on-time correction factor, and wherein the digital output regulator module uses a value of the counter as an index value to a lookup table that comprises pre-established on-time correction factors.

14. The system of claim 13, wherein the PLL module is further configured to measure a value of the line voltage sine wave and to compare the measured value with a previous measured value of the line voltage sine wave to identify a rising edge of the line voltage sine wave, and wherein the PLL module is configured to synchronize by further measuring a value of the line voltage sine wave and comparing the measured value with a value of a reference point on the line voltage sine wave.

15. The system of claim 14, wherein the reference point on the line voltage sine wave is a maximum peak voltage of the line voltage sine wave divided by two.

16. The system of claim 14, wherein if the measured value of the line voltage sine wave is greater than the value of the reference point, and the value of the counter is at its maximum, then the PLL module is configured to reset the counter and to maintain a current sampling period Tsampling.

17. The system of claim 14, wherein if the measured value of the line voltage sine wave is greater than the value of the reference point, and the value of the counter is not at its maximum, then the PLL module is configured to reset the counter and to adjust a current sampling period Tsampling, and wherein the current sampling period Tsampling is adjusted after a current phase locked loop is completed and before a next sample of the line voltage sine wave is measured.

18. A computer readable medium encoded with instructions that, when executed by one or more processors, cause the processor to perform operations of:

synchronizing a digital phase-lock-loop (PLL) module with a rectified line voltage signal input to a flyback converter to power a load;

detecting, with the PLL module, changes in phase of the line voltage signal; and regulating, with a digital output regulator module, at least one of output current, output voltage, and/or output power to the load using an on-time control signal that reflects a correction factor based on phase variation in the line voltage signal detected by the PLL module, wherein the on-time control signal controls switching of the flyback converter;

wherein synchronizing of the PLL module includes measuring at a sampling period Tsamplinq a value of the rectified line voltage signal, and adjusting the sampling period Tsampling based on changes in frequency of the rectified line voltage signal.

* * * * *